United States Patent
Pan (10) Patent No.: US 7,423,798 B2
(45) Date of Patent: Sep. 9, 2008

(54) ADDRESSING CIRCUIT AND METHOD FOR BI-DIRECTIONAL MICRO-MIRROR ARRAY

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 76 days.

(21) Appl. No.: 11/465,106

(22) Filed: Aug. 16, 2006

(65) Prior Publication Data
US 2007/0041078 A1    Feb. 22, 2007

Related U.S. Application Data

(60) Provisional application No. 60/708,857, filed on Aug. 16, 2005.

(51) Int. Cl.
G02B 26/00 (2006.01)
G02B 26/08 (2006.01)
G09G 3/34 (2006.01)
B41J 2/47 (2006.01)

(52) U.S. Cl. .................. 359/291; 359/290; 359/295; 359/298; 359/224; 359/226; 345/84; 345/108; 347/239; 347/255

(58) Field of Classification Search ........... 359/237, 359/290–296, 298, 214, 223, 224, 226, 486; 345/84, 85, 108, 204, 904; 348/203, 770, 348/771, 764; 216/24; 347/239, 255; 361/207, 361/233; 257/414, 629
See application file for complete search history.

(56) References Cited

U.S. PATENT DOCUMENTS

| | | | | |
|---|---|---|---|---|
| 4,421,381 A * | 12/1983 | Ueda et al. | ............ | 359/214 |
| 5,061,049 A | 10/1991 | Hornbeck | ............ | 359/224 |
| 5,142,405 A | 8/1992 | Hornbeck | ............ | 359/226 |
| 5,212,582 A * | 5/1993 | Nelson | ............ | 359/224 |
| 5,331,454 A | 7/1994 | Hornbeck | ............ | 359/224 |
| 5,382,961 A | 1/1995 | Gale, Jr. | ............ | 345/108 |
| 5,665,997 A | 9/1997 | Weaver et al. | ............ | 257/414 |
| 5,912,758 A * | 6/1999 | Knipe et al. | ............ | 359/290 |
| 5,920,417 A * | 7/1999 | Johnson | ............ | 359/223 |
| 6,275,326 B1 * | 8/2001 | Bhalla et al. | ............ | 359/298 |
| 6,525,759 B2 * | 2/2003 | Kawai | ............ | 347/239 |
| 6,661,637 B2 * | 12/2003 | McIntosh et al. | ............ | 361/233 |
| 6,870,659 B2 | 3/2005 | Aubuchon | ............ | 359/291 |
| 6,992,810 B2 | 1/2006 | Pan et al. | ............ | 359/290 |
| 7,046,422 B2 * | 5/2006 | Kimura et al. | ............ | 359/295 |
| 7,095,545 B2 * | 8/2006 | Regan | ............ | 359/290 |
| 7,167,298 B2 * | 1/2007 | Pan | ............ | 359/291 |
| 7,245,415 B2 * | 7/2007 | Pan | ............ | 359/291 |

(Continued)

OTHER PUBLICATIONS

Shaoher X. Pan, "High Contrast Spatial Light Modulator", U.S. Appl. No. 10/974,461, filed Oct. 25, 2004, 31 pp.

Primary Examiner—Loha Ben
(74) Attorney, Agent, or Firm—Fish & Richardson P.C.

(57) ABSTRACT

A control substrate of spatial light modulator for a bi-directional micro mirror array includes a plurality of unit cells, each includes a common electrode at a fixed constant potential and an addressing electrode under the mirror plate on opposite sides of a pivot point of the mirror hinge, a pair of micro landing tips, a single CMOS transistor electrically connected to a storage capacitor, and a word-line/bit-line interconnection structure for communicating signals.

25 Claims, 6 Drawing Sheets

U.S. PATENT DOCUMENTS 7,298,542 B2 * 11/2007 Regan ................. 359/290
2005/0128564 A1   6/2005 Pan ..................... 359/291
2005/0212734 A1 * 9/2005 Kimura ................ 345/84

* cited by examiner

ADDRESSING CIRCUIT AND METHOD FOR BI-DIRECTIONAL MICRO-MIRROR ARRAY

CROSS-REFERENCE TO RELATED APPLICATIONS

This application claims the benefit of U.S. Provisional Application No. 60/708,857, filed on Aug. 16, 2005, which is incorporated by reference herein.

TECHNICAL FIELD

This invention relates to addressing micro mirror array based spatial light modulators (SLMs).

BACKGROUND

A micro mirror array based SLM integrates dynamic micromechanical systems with semiconductor circuitry. A reflective SLM can include an array of mirror cells comprised of a mirror, hinge, support structure, and underlying CMOS circuitry. One mechanism for driving a micro mirror array tilts the mirrors with a torsion torque around the hinge, where the torque is generated by electrostatic force in a capacitive parallel plate configuration. An electrostatic attractive force is generated when two conductive plates at different electric potentials are brought in close vicinity with one another. The electrostatic torque is proportional to the square of the voltage difference across the gap between an electrode, the first plate, and the mirror, the second plate, and inversely proportional to the square of the gap size. The gap size varies as the mirror rotates through its range of angular positions. When the mirror is in its fully rotated orientation, the mirror is in a landing position. A mirror pixel of an SLM is switched from one state to another when the mirror is rotated from one landing position to another. The change of the state is accomplished by changing the net potential difference across the gap under both sides of the mirror hinge.

As the demand for SLMs with a large defection angle to achieve brighter images and higher contrast ratio increases, gap size is reduced drastically near the landing position. This can cause the electromechanical efficiency of the coupling between the two plates to deteriorate when transitioning from a parallel state to a large angle state. Traditionally, this can be compensated for by applying a higher bias or addressing voltage potential across the plates to ensure the operation of the SLM.

The optical properties of an SLM depends on the parameters of the micro mirrors, such as mirror fill-ratio, reflectivity, rotating angles, and angular transition times. However, the efficiency, robotics and reliability of the video operation also rely on the design of driving voltage waveforms. Two critical parameters from the physical property of the micro mirrors provide guidelines for CMOS control circuitry design. Snapping voltage, an indication of hinge stiffness, is a voltage reached when the electrostatic force is high enough that the mirror plate snaps from its quiescent or flat state to physically stopping at a landing position. Release voltage, an indication of surface adhesion or stiction, is a voltage reached when the electrostatic force is low enough that mirror is no longer held in contact with a landing stop and returns to its quiescent state.

In bi-directional operation, a pair of electrodes is positioned under the mirror plate on opposing sides the hinge. A third electrode connected to mirror plate is used in conjunction with the pair of electrodes to control the operation of the micro mirror arrays. One method to operate the bidirectional micro mirror array is to establish a fixed negative common bias on each mirror plate, then control the direction of rotation and enable the transition or rotation simultaneously by changing the voltage potential of the two addressing electrodes. The operation requires two independent transistor cells with complex circuitry. An alternative circuit design replaces one of the two transistor cells with an inverter so a single addressing voltage is sufficient to enable an angular cross over transition or rotation. The fixed negative common bias is used to lower the addressing voltage and compensate for the high snapping voltage of a typical MEMS based micro mirror.

Another method for a bi-directional operation is to control the voltage potential of an individual mirror plate by addressing circuitry while fixing the constant voltage potentials on each of the two bottom common electrodes on opposite sides of the pivot point of the hinge. This addressing scheme requires only a single drain line and one transistor per pixel, which significantly lowers the transistor count. However, each mirror pixel in the mirror array must be electrically isolated and individually and selectively addressable by an addressing circuitry in the control substrate. Another drawback is that the control circuit is vulnerable to the interference of photoelectron current generated by the incident light since the address node is directly connected to the mirror plate.

SUMMARY

A control substrate of a spatial light modulator using a bidirectional micro mirror array having a plurality of unit cells, each including a common electrode at a fixed potential and an addressing electrode under the mirror plate on opposite sides of a pivot point of a mirror hinge, a pair of landing tips, a single CMOS transistor electrically connected to a storage capacitor, and a word-line/bit-line interconnection structure for communicating signals is described. The upper surfaces of the pair of electrodes have metal steps raised above the surface of the control substrate to reduce the effective gap under each mirror. Coupled with a common bipolar bias on the micro mirror array, the integrated spatial light modulator can operate with an effective drive voltage waveform for large angle deflection.

In one aspect, a spatial light modulation device is described. The device has an array of cells. Each cell has a mirror plate having an upper reflective surface and a lower conductive surface, a hinge electrically connected to the lower conductive surface of the mirror plate forming an axis around which the mirror plate rotates, a support on a control substrate electrically connected to and supporting the mirror plate, a first electrode on the surface of the control substrate on a first side of the axis and a second electrode on the surface of the control substrate on a second side of the axis opposite to the first side. All of the mirror plates within the array are electrically connected to one another, the first electrode of each cell is configured to apply a fixed voltage during operation so that the fixed voltage is applied at each cell and the array of cells are electrically connected to circuitry in the control substrate for selectively establishing at each cell an address voltage at each second electrode.

Implementations of the device can include one or more of the following aspects. Each cell can have a third electrode in electrical communication with the mirror plate and the support. Each cell can comprise a landing stop configured to extend upwardly from the control substrate and contact a bottom of the mirror plate when the mirror plate is rotated. The landing stop can be electrically connected to the third electrode. The third electrode can be capable of establishing a sharp voltage potential transition from Vb to −Vb and from −Vb to Vb in less than one microsecond. The device circuitry in the control substrate may include, for each cell, a single CMOS transistor electrically connected to the second electrode. The CMOS transistor can be electrically connected to a storage capacitor. The device circuitry can include a word-line/bit-line interconnection structure on the control substrate for communicating signals to the cells. The first electrode and the second electrode can have at least one level of conductive step material raised above the surface of control substrate. The control substrate can be free of inverters. The hinge can extend between two opposite corners of the mirror plate or can be parallel to an edge of the mirror plate.

In another aspect, methods of using the spatial light modulation device are described. One method includes applying the fixed voltage to each first electrode in each cell in the array and addressing at least one second electrode, wherein two of the second electrodes are at different voltages from one another.

Implementations of the method can include one or more of the following steps. The mirror plates can be brought to a common potential. Each cell can have landing stops configured to extend upwardly from the control substrate and contact a bottom of the mirror plate when the mirror plate is rotated and the method can include bringing each of the landing stops to the common potential. The common potential can be changed to a new potential and reverted back to the common potential and while the voltage applied to at least one second electrode is changed from a first addressing potential to a second addressing potential. The steps of changing the common potential, reverting back to the common potential and changing the voltage applied to at least one second electrode can cause a corresponding mirror plate to rotate from a first position to a second position. The step of changing the common potential to the new potential and reverting back to the common potential can include applying a sharp bipolar pulse. In some embodiments, the second addressing potential is at least twice the magnitude of the fixed voltage.

In another aspect, a method of using a spatial light modulator is described. A fixed voltage is applied to a first electrode under a mirror plate, an addressing voltage is applied to a second electrode under the mirror plate. A bias is applied to the mirror plate, so that the addressing voltage and the bias on the mirror plate are at the same polarity. A sharp voltage pulse is applied to the mirror plate, where the sharp voltage pulse is opposite in polarity to the bias applied to the mirror plate.

Implementations of the method can include one or more of the following aspects. The sharp voltage pulse can have a magnitude equal to the bias applied to the mirror plate. The bias applied to the mirror plate can also be applied to landing tips and the sharp voltage pulse can be simultaneously applied to the landing tips and the mirror plate. The addressing voltage can be changed during operation and can be changed concurrent with applying a sharp voltage pulse. The bias can have a positive polarity and applying a sharp voltage pulse to the mirror plate can include applying a negative polarity. A sharp voltage pulse can be applied to cause the mirror plate to rotate and applying a sharp voltage pulse can include applying a single sharp voltage pulse for each mirror rotation.

DETAILED DESCRIPTION

Figure 1:
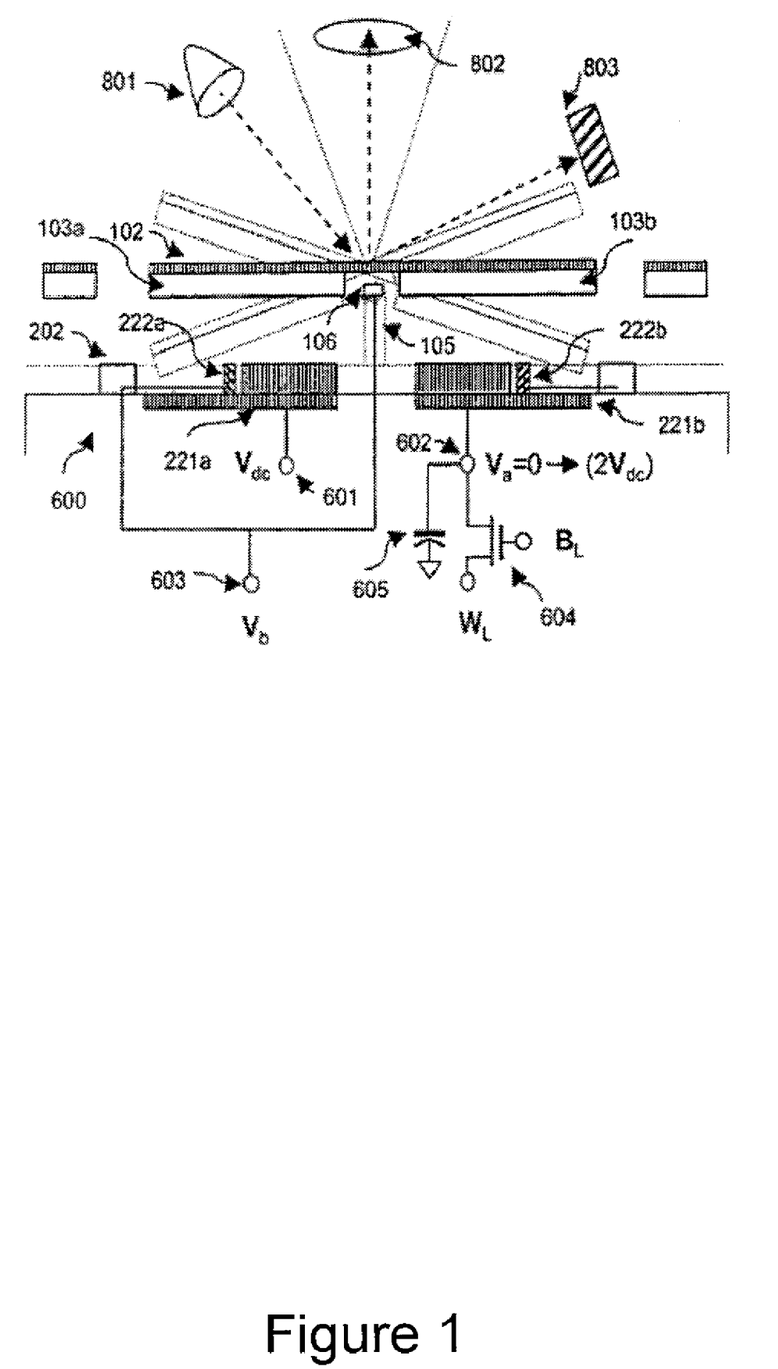
FIG. 1 is a side view of a unit cell of a spatial light modulator coupling a micro mirror array with a control substrate.

Referring to FIG. 1, one pixel cell of an SLM is shown. The SLM has a control substrate 600 and an array of mirror plates 102, each cell of the SLM having a single mirror plate 102. The control substrate 600 has a pair of metal step electrodes 221a and 221b raised above the surface of the control substrate 600 on either side of a center of the cell. A pair of micro landing tips 222a and 222b are oriented perpendicular to a surface of the substrate 600 on which they are located. Steps on the two electrodes 221a and 221b reduce the effective gap between a mirror plate 102 and the electrodes 221a, 221b which significantly increases the efficiency of electrostatic torques in the system. Reducing the gap decreases the snap voltage of mirror plate and enables a much smaller addressing voltage potential $V_a$ to rotate the mirror plate 102 for cross over transition. The metal steps of electrodes 221a and 221b can be formed of deposited metal layers. High-aspect-ratio etched micro landing tips 222a and 222b can have a diameter of about 0.1 micron and are oriented perpendicular to the surface of control substrate 600.

The mirror plate 102 has a right half 103b on the right side of the hinge 106 and over electrode 221b and a left half 103a on the left side of the hinge 106 and over electrode 221a. The micro landing tips 222a and 222b under opposite sides of a hinge 106 around which the mirror plate 102 rotates are electrically connected to the lower surface of mirror plate 103a and 103b through a conductive layer in the hinge 106 and a support 202. Equal electrical potential of a half 103a, 103b of the mirror plate 102 and its corresponding landing tip 222a, 222b prevents spark welding during the contact landing operation.

The bidirectional micro mirror uses a dc offset ($V_{dc}$), a common bipolar bias ($V_b$), and an addressing voltage ($V_a$) controlled by a single CMOS transistor 604 electrically connected to a storage capacitor 605 and a word-line/bit-line interconnection structure for communicating signals. There are two common electrodes in the mirror array, a common bias electrode 603 and a fixed constant potential electrode 601 on the control substrate 600 under a mirror plate 102 on one side of the hinge 106. The common bias electrode 603 is electrically connected to the lower conductive surfaces of every mirror plate 102 in the array and is controlled by a bipolar voltage supply $V_b$ capable of providing a sharp bipolar pulsing voltage. A fixed constant potential electrode 601 is electrically connected to a common dc offset $V_{dc}$ in the control substrate 600. The addressing electrode 602 under the right half of the mirror plate 103b and on a side of the pivot point of hinge 106 opposite to fixed constant potential electrode 601 is controlled by the single CMOS transistor 604 electrically connected to a storage capacitor 605 in the control substrate 600. The circuit is operated by a single drain line and one transistor per micro mirror cell, significantly reducing the complexity of the SLM over conventional SLM designs.

In bidirectional operation, the fixed dc voltage on the first electrode 221a [$V_{dc}$] establishes an electromechanical latch on the mirror plate 102, so that the mirror always rotates toward the "off" state from a quiescent or flat state if the second electrode 221b [$V_a$] connected to the addressing electrode 602 is at a lower voltage. The addressing voltage [$V_a$] of the second electrode 221b controls the direction that the mirror plate 102 rotates. With a simplified assumption ignoring two important factors, stiffness of the torsion hinge 106 and contact surface adhesion, each mirror has a tendency to rotate toward the first electrode or turn to the "off" state if [$V_a$]<[$V_{dc}$]. The mirror 102 rotates towards the second electrode 221b or turn to the "on" state if [$V_a$]>[$V_{dc}$].

In addition to applying a potential at the electrodes 601, 602, the lower conductive surface of each mirror plate 102 on the micro mirror array is connected electrically to a common bipolar bias $V_b$ through a conductive layer in the hinges 106 and the supports 202. The voltage potential established by the bipolar bias $V_b$ enhances the electrostatic forces on both side of the hinge 106. This strengthening is unequal on two sides at the landing position, due to the large difference in the gap size. The bias voltage $V_b$ determines the potential across the gap on either side of the mirror plate, and thus can determine in part which way the mirror plate rotates. An increase in magnitude of bias voltage $V_b$ on the lower surface of the mirror plate 102 has little impact on which direction the mirror plate 102 rotates toward. However, a sharp increase of electrostatic force F on the whole mirror plate 102 provides a dynamic excitation by converting the electromechanical kinetic energy into an elastic strain energy stored in the deformed mirror hinges 106 and deformed micro landing tips 222a or 222b. After a bipolar pulse is released on the common bias $V_b$, the elastic strain energy of a deformed micro landing tip 222a or 222b and deformed mirror hinges 106 is converted back to the kinetic energy of the mirror plate as it springs and bounces away from the landing tip 222a or 222b. This perturbation of the mirror plate toward the quiescent state enables a much smaller addressing voltage potential $V_a$ to rotate the mirror plate and cause the mirror plate to cross over from one landing position to the other. In the following example, $V_{dc}$ is held constant at +5V to illustrate the method of operation for the bi-directional micro mirror. A bias voltage potential [$V_b$] is then introduced at the common bias electrode 603 of the mirror array to illustrate its impact on the electromechanical latching of a mirror plate at each contact stop.

Figure 2A:
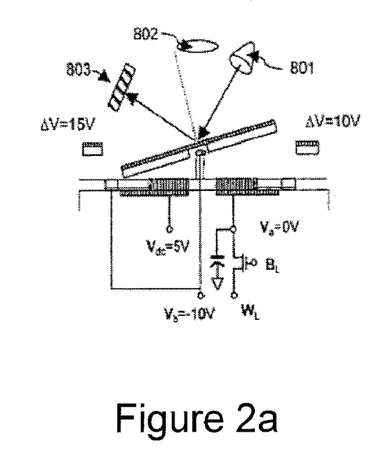
FIG. 2a is a cross sectional side view of one pixel element of a micro mirror array according to one embodiment of the presentation invention rotated to the "off" state using a constant −[$V_b$] bias.
Figure 2B:
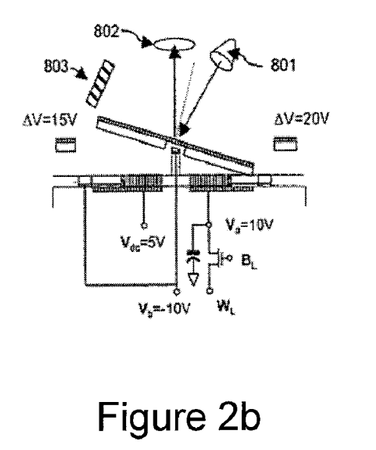
FIG. 2b is a cross sectional side view of one pixel element of a micro mirror array according to one embodiment of the presentation invention rotated to the "on" state using a constant −[$V_b$] bias.

FIGS. 2a and 2b illustrate an angular cross over transition, or rotation, of a micro mirror 102 in a [$V_b$]=−10V biased micro mirror array from its "off" (dark) state to its "on" (bright) state when the addressing voltage [$V_a$] is switched from 0V to +10V. In FIG. 2a, the addressing voltage [$V_a$] is set to 0V. The potential difference [ΔV] across the gap on the side of light absorption device 803 ("off" state) [$V_b$−$V_{dc}$] is roughly 15V. The potential difference [ΔV] across the gap on the side of light source 801 ("on" state) [$V_b$−$V_a$] is roughly 10V. Ignoring the effects of the stiffness of torsion hinge 106 and contact stiction, the mirror plate 102 will rotate from a quiescent or flat state toward the direction of a light adsorption device to be in an "off" (dark) state when the electrodes are set to these potentials. As the addressing potential [$V_a$] is switched from 0V to +10V, the potential difference [ΔV] across the gap on the light source side changes to roughly [$V_b$−$V_a$]=20V. The mirror plate rotates toward the direction of the light source 801 to be in an "on" (bright) state. In other words, if no addressing voltage is applied ($V_a$=0V), the micro mirror will always turn to the "off" (dark) state, which significantly reduces the artifacts of defective and damaged pixels on displayed images.

Figure 3A:
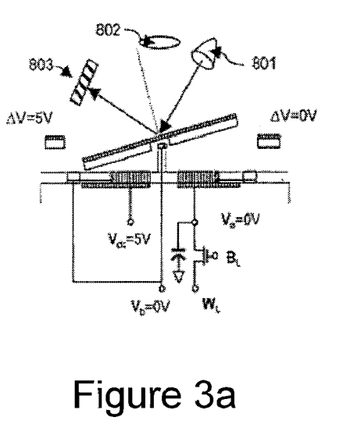
FIG. 3a is a cross sectional side view of one pixel element of a micro mirror array according to one embodiment of the presentation invention rotated to the "off" state when the common bias electrode is grounded.
Figure 3B:
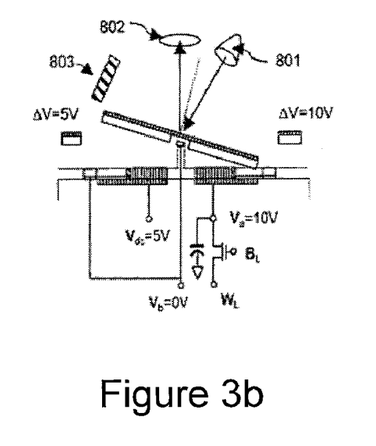
FIG. 3b is a cross sectional side view of one pixel element of a micro mirror array according to one embodiment of the presentation invention rotated to the "on" state when the common bias electrode is grounded.

FIGS. 3a and 3b illustrate every micro mirror in the micro mirror array based spatial light modulator being grounded [$V_b$]=0V. In FIG. 3a, the addressing voltage [$V_a$] is set to 0V. The potential difference [ΔV] across the gap on the side of light absorption device 803 ("off" state) [$V_b$−$V_{dc}$] is roughly 5V. The potential difference [ΔV] across the gap on the side of light source 801 ("on" state) [$V_b$−$V_a$] is now 0V. The mirror rotates toward the "off" (dark) state from a quiescent or flat state. As the addressing potential [$V_a$] is switched from 0V to +10V, as shown in FIG. 3b, the potential difference [ΔV] across the gap on the side of light source 801 changes to roughly [$V_b$−$V_a$]=10V. The mirror plate rotates toward the direction of light source 801 to be in an "on" (bright) state.

Figure 4A:
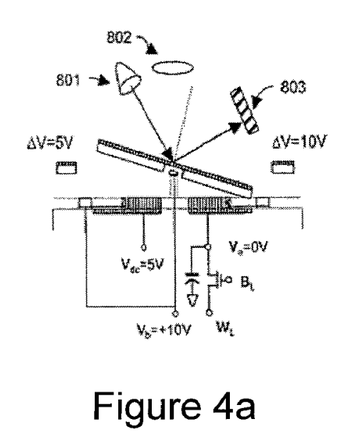
FIG. 4a is a cross section side view of one pixel element of a micro mirror array according to another embodiment of the presentation invention rotated to the "off" state using a constant +[$V_b$] bias.
Figure 4B:
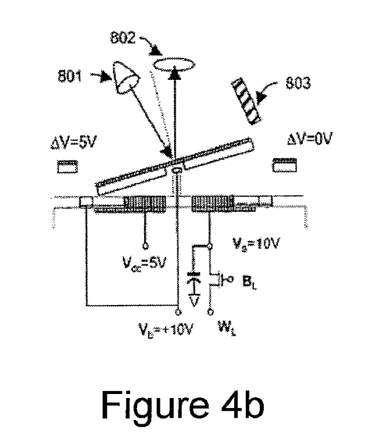
FIG. 4b is a cross section side view of one pixel element of a micro mirror array according to another embodiment of the presentation invention rotated to the "on" state using a constant +[$V_b$] bias.

FIGS. 4a and 4b illustrate every mirror in the micro mirror array based spatial light modulator being biased to a positive potential [$V_b$]=+10V. In FIG. 4a, the addressing voltage [$V_a$] is set to 0V. the light source 801 and light absorption device 803 have changed positions. The potential difference [ΔV] across the gap on the side of the light absorption device 803 ("off" state) [$V_b$−$V_{dc}$] is roughly 10V. The potential difference [ΔV] across the gap on the side of light source 801 ("on" state) [$V_b$−$V_a$] is now 5V. The mirror rotates to a dark or "off" state from a quiescent or flat state. As the addressing potential [$V_a$] is switched from 0V to +10V, as shown in FIG. 4b, the potential difference [ΔV] across the gap on the side of the light source 801 changes to roughly [$V_b$−$V_a$]=5V, while the potential difference [ΔV] across the gap on the side of the light absorption device 803 goes to 0V. The mirror plate rotates from a quiescent or flat state toward the direction of the light source to be in an "on" state. The potential difference between the bias $V_b$ and addressing voltages $V_a$ on one side of the mirror versus the difference between the bias $V_b$ and the fixed voltage $V_{dc}$ on the opposite side of the hinge 106 determine which direction the mirror rotates toward. The addressing electrodes, light source and light absorption device can all be positioned so that no addressing voltage (addressing voltage=0V) creates a dark pixel.

It is clear from the embodiments described herein that the addressing voltage selectively determines whether the mirror is in an "on" (bright) or "off" (dark) state. Even though the net electrostatic torque on the mirror plate ([ΔV]$_{on}$−[ΔV]$_{off}$) is equal during a quiescent or flat state for all three cases, where $V_b$ =−10V, 0V and +10V, negative common bias −$V_b$ on the mirror plates 102 provides the strongest electrostatic force F on the mirror plate 102. In other words, the mirror plate 102 is pressing hardest onto the micro landing tips 222a or 222b when a negative voltage potential ($V_b$<0) is applied to the common bias electrode 603.

The angular cross over transition or rotation of a mirror plate in the micro mirror array described above is used to illustrate the effects of each control voltage on the mirror's electromechanical performances. In an actual device, hinge stiffness, surface contact adhesion and the variation of electrostatic torques as a function of the angle of mirror plate all play important roles in the robotics and reliability of the device. A method of decoupling the angular direction and the angular transition is presented to effectively deal with a more realistic environment of bi-directional micro mirror operation.

To decouple the angular direction from the angular transition, a sharp pulse of bipolar voltage potential is introduced to the common bias electrodes connected to every mirror in the micro mirror array. By combining the three cases described in FIGS. 2a and 2b ($V_b$<0), FIGS. 3a and 3b ($V_b$=0), and FIGS. 4a and 4b ($V_b$>0), a bipolar pulsing voltage potential is applied on the mirror plate and landing tips 222a and 222b followed by an angular cross over transition to a non-contact position or near the quiescent state. A sharp bipolar pulse significantly lowers the energy barrier of the angular cross over transition by generating a dynamic perturbation separating the mirror from its landing tip 222a or 222b, which effectively overcomes the stiction of contact landing. By eliminating contact surface adhesion or contact stiction, the addressing voltage potential [$V_a$] need only to overcome electromechanical and mechanical latches for a complete cross over transition.

Figure 5:
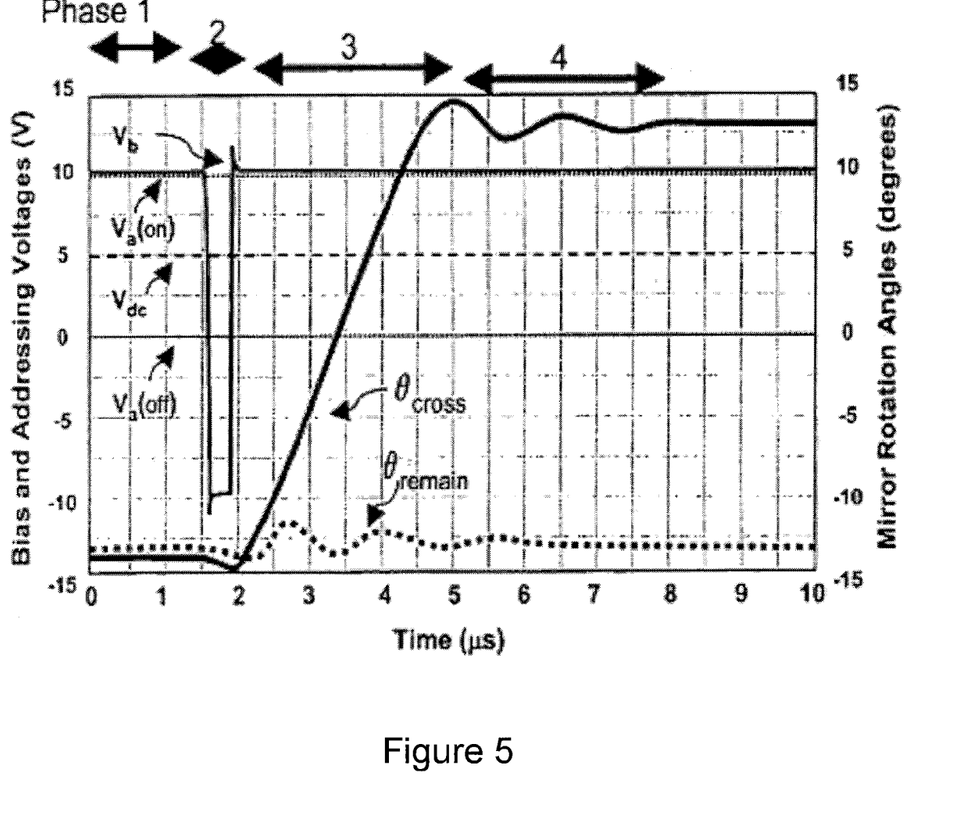
FIG. 5 shows a graph of time versus voltage and rotational angle.

FIG. 5 shows the rotation angles of a micro mirror as a function of bias voltages $V_b$ and addressing voltages $V_a$ at four different operational phases. In a bi-directional operation, the first electrode 601 on the control substrate 600 under a micro mirror in the array is connected to a common fixed voltage, [$V_{dc}$]=+5V. The second electrode 602 on the control substrate 600 on the opposite side of the hinge 106 is selectively controlled by an addressing voltage [$V_a$] generated by a single CMOS transistor 604 electrically connected to a storage capacitor 605, and a word-line/bit-line interconnection structure for communicating signals. To turn the spatial light modulator device to an "on" (bright) state, an addressing voltage $V_a$ twice the value of the fixed voltage $V_{dc}$ ($V_a$=2×$V_{dc}$) is applied. If an addressing voltage $V_a$ less than $V_{dc}$ is received at the second electrode 602, the SLM device automatically turn to an "off" or dark state, which significantly reduces the artifacts of defective and damaged pixels on displayed images.

To perform an angular cross over transition from one state to another requires a much more sophisticated address and bias waveform design, due to the impact of hinge stiffness and contact surface adhesion. In phase 1 of FIG. 5, a mirror plate is resting in an initial landing position regardless of the state of addressing voltage $V_a$, whether it is 0V or 10V. In some cases, the mirror plate can be resting in a landing position other than the position that the mirror would be in if the same voltage $V_a$ were applied to a mirror starting in a quiescent state. The reason a mirror is able to continue resting in this unfavored or quasi-stable tilted position is because in this position, the smaller gap between the mirror and electrode has a much higher effective electrostatic torque than on the other side. Furthermore, contact surface adhesion or stiction prevents the mirror plate from separating from its landing position, even though the static net potential difference of two electrodes under opposite sides of the hinge is in favor of the other landing position.

In the phase 2 of FIG. 5, a dynamic excitation is introduced by applying a bipolar pulse voltage to the common bias electrode electrically connected to every mirror in the array. A shock of a bipolar pulsing voltage potential from $V_b$ to −$V_b$ and back to $V_b$ on every mirror plate presses every mirror hard onto its micro landing tip. The kinetic energy generated by the electromechanical shock is converted into elastic strain energy and stored in each deformed mirror hinge and deformed micro landing tip. As the bipolar pulsing voltage potential $V_b$ is released and the common bias voltage is back to +$V_b$, as shown in phase 3 in FIG. 5, the stored elastic strain energy of each deformed mirror hinge and deformed micro landing tip is released into kinetic energy, separating the mirror plate from its landing tip. As the mirror springs away from being in contact with its landing tip, its final destination depends on the state of the addressing voltage $V_a$ selectively applied on each mirror in the array. If the addressing voltage $V_a$ is set at 0V, the mirror plate will rotate to the "off" (dark) state from its dynamic perturbation state. If initially a mirror pixel was at the "on" (bright) state, a cross over angular transition will occur since the mirror plate is no longer in contact with the micro landing tip while in the dynamic perturbation state, as indicated by the solid trajectory curve in phase 3. If initially a mirror pixel was at the "off" (dark) state, the mirror will be attracted back to its initial "off" (dark) state after going through a dynamic perturbation near the landing position, as shown in the dashed curve in phase 3 of FIG. 5.

If the addressing voltage $V_a$ is set at +10V, the net potential differences generated by all three electrodes favor mirror plate rotation from a quiescent or near flat state toward the light sources turning the mirror pixel to "on" (bright) state. If the initial state of a mirror is in the "on" (bright) state, the mirror plate will remain in the same initial state even after a dynamic perturbation by a sharp bipolar pulse on the common bias, as shown in a dashed curve in phase 3 of FIG. 5. If the initial state of a mirror is in the "off" (dark) state, a cross over angular transition of the mirror will occur as the mirror springs and bounces away from its landing tip, as indicated by the solid trajectory curve in FIG. 5. The waving curves in the phase 4 of FIG. 5 indicate a settling down of the micro mirror to its bi-stable landing contact position as a function of time.

Figure 6:
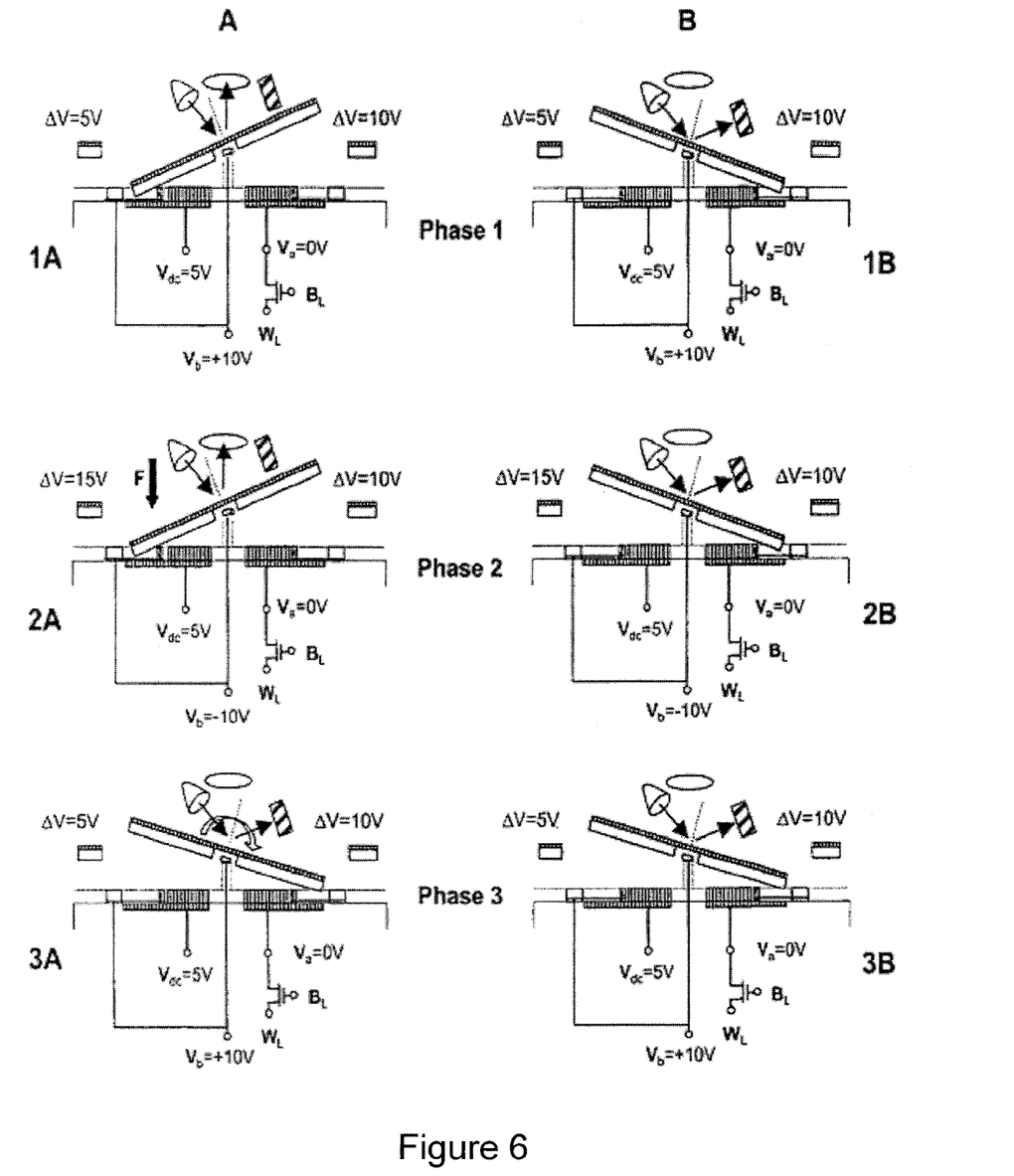
FIG. 6 shows the applied bias voltages and potential differences for each stage of operation when the addressing voltage is set to 0V.

FIG. 6 shows two possible initial states of a micro mirror in the array going through the bi-directional operation cycle to arrive at its final bi-stable state when an addressing voltage $V_a$ is set at 0V. The applied bias voltages and the simplified net potential difference [Δ$V$] across the gap are labeled to illustrate the dynamic excitation of the mirror plate near the landing position and angular cross over transition mechanisms. In column A, the initial state of a micro mirror in phase 1 is the "on" position (bright state). Even a positive bias $V_b$=+10V generating a bi-stable potential in favor of the "off" position (dark state) could not initiate an angular cross over transition. The reason this mirror plate is held in the "on" position (bright state) is because of the smaller gap between the landing tip and electrode on the left side, resulting in much stronger electrostatic torque on that side, and because of the contact surface adhesion prevents angular cross over transition. In phase 2, a sharp bipolar pulse voltage potential is applied on the common bias electrode connected to every mirror plate in the array, dropping the bias potential from $V_b$=+10V to $V_b$=−10V. This bipolar pulse results in a significant increase of net potential difference [Δ$V$]$_{on}$, in the reduced gap on the contacting side from 5V to 15V. The sharp increase of electrostatic force F presses the mirror plate forcefully onto the micro landing tip. The kinetic energy generated by this bipolar pulsing electrostatic potential is converted into elastic strain energy of deformed mirror hinges and deformed micro landing tips. As the bias voltage potential $V_b$ quickly releases and returns to $V_b$=+10V, the stored elastic strain energy in the deformed hinges and landing tips is converted back to kinetic energy to spring and bounce the mirror plate separating it from its landing tip. As the mirror plate springs and bounces away from landing tip, the bias voltage potential is set back to $V_b$=+10V. The net potential difference [$\Delta V$] in conjunction with the addressing voltage at 0V enables an angular cross over transition, as indicated in phase 3 (see FIG. 5), to rotate the mirror plate to the "off" (dark) state. The angular cross over transition will only occur after a sharp bipolar pulse voltage potential is applied onto the common bias electrode of the micro mirror array.

Column B of FIG. 6 illustrates what a mirror plate initially resting in an "off" (dark) state experiences during the same cycle of voltage changes described above for column A. As a sharp bipolar pulse $V_b$ is applied to the common bias electrode, net voltage potential difference [$\Delta V$]$_{off}$ on the contacting side remains the same throughout the whole cycle, from phase I to phase 4. Even though the net voltage potential difference [$\Delta V$] on the opposite side increases 10V, it is a relatively small increase in the electrostatic torque due to large gap between the mirror and landing tip on the non-contact side. The increase in net voltage potential [$\Delta V$] creates a relatively small electrostatic torque, which is only enough to undergo a dynamic perturbation with mirror plate remaining near the landing position. As the bipolar pulse is quickly released, the net voltage potential difference [$\Delta V$]$_{on}$ on the opposite side decreases back to 5V. The mirror plate settles down from its dynamic perturbation and stabilizes at the "off" (dark) state. No matter what initial state a mirror pixel is on, setting a 0V addressing voltage $V_a$ tends to rotate the mirror plate to the "off" (dark) state.

Figure 7:
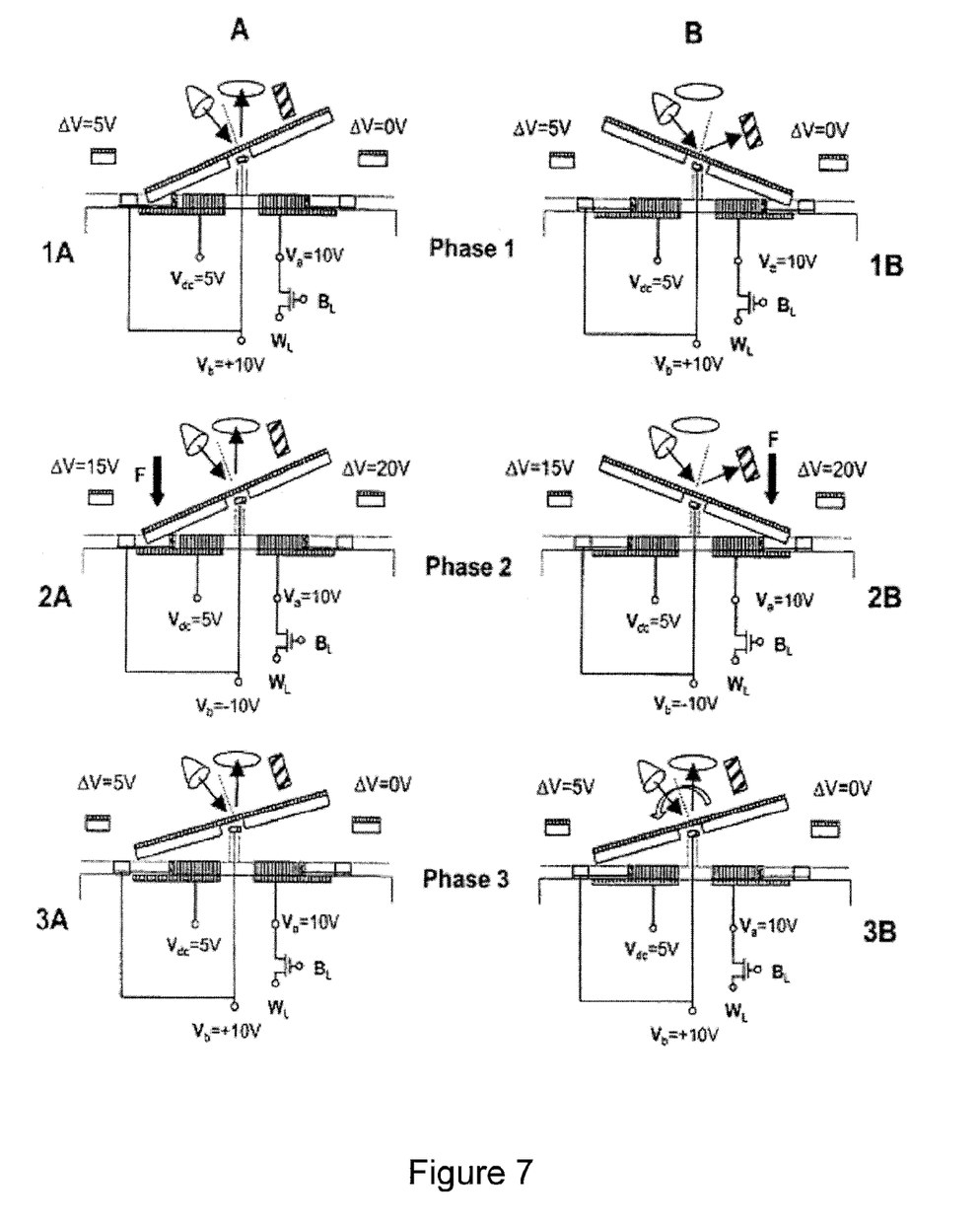
FIG. 7 shows the applied bias voltages and potential differences for each stage of operation when addressing voltage is set to 10V.

FIG. 7 shows the transition of a mirror in the micro mirror array going through a complete angular cross over transition cycle when the addressing voltage $V_a$ is set to a +10V. Column A illustrates the transition of a mirror initially rested in the "on" (bright) state. As a sharp bipolar pulse voltage $-V_b$ is applied on the common bias electrode connected to the lower surface of every mirror plate in the array, the net voltage potential [$\Delta V$] on the contacting side increases from 5V to 15V. With a smaller gap, a 10V increase in the net potential difference carries a much stronger electrostatic torque compared with that of a 20V increase of the net potential difference [$\Delta V$] on the opposite side with a much larger gap. The net effect of a sharp bipolar pulse voltage $V_b$ change on the common bias electrode is a forceful pressing of mirror plate onto the landing tip. The kinetic energy of a sharp electromechanical pulse is quickly converted into the elastic strain energy stored in the deformed mirror hinges and deformed micro landing tip. As the sharp bipolar pulse voltage potential $V_b$ is released from the common bias electrode, elastic strain energy of the hinge and tip is released as kinetic energy causing a dynamic perturbation of mirror plate near the landing position. After the voltage potential of common bias is back at $V_b$, the mirror plate is attracted back to the initial landing position from its dynamic perturbation state. The mirror plate settles down and stabilizes back to the same "on" (bright) state.

If initially a mirror in the array rested in the "off" (dark) state, the bi-directional operation cycle will go through a completely different scenario. Column B in FIG. 7 illustrates an angular cross over transition when a mirror is resting in the "off" (dark) state while the addressing voltage potential $V_a$ is set at 10V. Again, as a sharp bipolar pulse voltage $V_b$ is applied to the common bias electrode, a 20V increase in the net potential difference [$\Delta V$] generates a shock of electrostatic torque on the mirror plate in the contact landing side (down side). The strong force F presses the mirror plate onto the landing tip. The kinetic energy of the electromechanical shock is converted into the elastic strain energy stored in the deformed mirror hinges and deformed micro landing tip. As the sharp bipolar pulse voltage potential $V_b$ is released from the bias electrode, this elastic energy is released back into kinetic energy of the mirror separating mirror plate away from the landing tip. After the voltage potential of the common bias is switched back to $V_b$, the mirror plate is attracted to the side with the higher net difference of voltage potential [$\Delta V$] and rotates. Rotation becomes possible when the electrostatic torques generated by the net potential difference [$\Delta V$] need only to overcome stiffness of the hinge without the impact of contact surfaces adhesion or stiction. After the angular cross over transition, the mirror plate eventually settles down and stabilizes in its "on" (bright) state.

Figure 8:
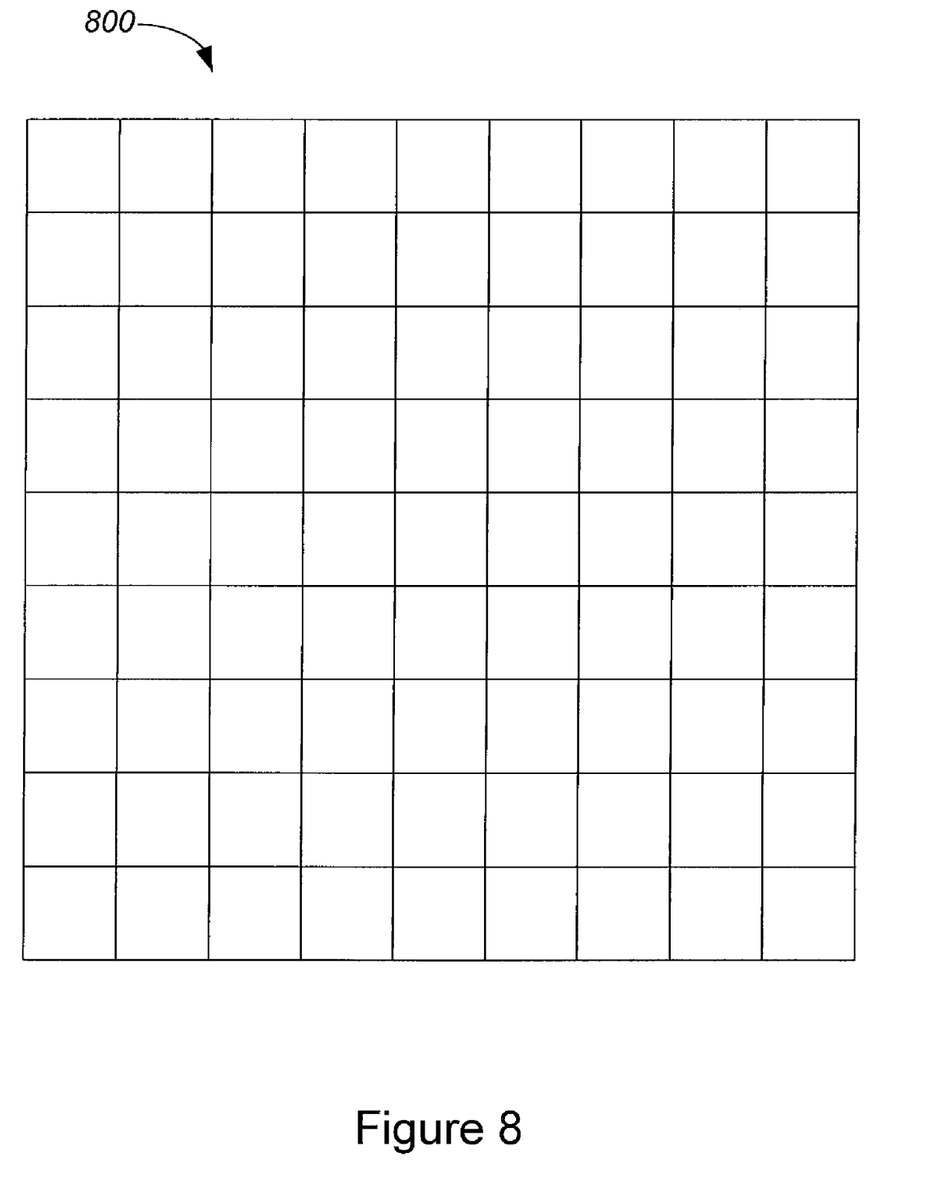
FIG. 8 is a plan view of an array of mirror plates.

FIG. 8 shows a SLM with multiple mirror plates 800. Each mirror plate in the array is at the same bias $V_b$ and has an electrode that is at a fixed potential $V_{dc}$. Each mirror plate 800 can be individually addressed with an addressing voltage $V_a$. Thus, during operation, the mirrors will be tilted in one of two directions. The hinge (not shown) under each mirror can either run parallel to an edge of the mirror or diagonally from one corner to another of the mirror.

The SLM with the circuitry described herein allows for forming an array with a single drain line and one transistor per mirror cell, significantly reducing the complexity of the SLM over SLM designs that require two transistors for each cell. Additionally, the circuitry does not require inverters, which is required in some SLM designs that have eliminated one of the transistors by introducing an inverter. The circuitry described herein is not vulnerable to interference form current generated by incident light.

Although the invention has been particularly shown and described with reference to multiple embodiments, it will be understood by persons skilled in the relevant art that various changes in form and details can be made therein without departing from the spirit and scope of the invention. For example, the dynamic perturbation of a mirror plate generated by a sharp bipolar pulse of voltage potential $V_b$ on the common bias of a micro mirror array causes both the deformation of the mirror hinge and the deformation of the landing tip. In a micro mirror array based SLM, non-deformable landing pads can be used instead of landing tip. Then the dynamic perturbation will be attributed to the deformation of the mirror hinges in the micro mirror array. In another embodiment, the fixed voltage potential $V_{dc}$ of the first electrode on the control substrate and the addressing voltage potential $V_a$ on the opposite side of a hinge are all positively biased. If the fixed voltage potential $V_{dc}$ of the first electrode and the addressing voltage potential $V_a$ are all negatively biased, a sharp positive pulse is required from $-[V_b]$ to $+[V_b]$ and back to $-[V_b]$ to enable the same angular cross over transition.

Aside from video displays and printing applications, the spatial light modulator described here is also useful in other applications, such as in maskless photolithography, where the spatial light modulator directs light to develop deposited photoresist, and in photonic switches, where the optical signals are directed and distributed among fiber optic networks.

What is claimed is:

1. A spatial light modulation device comprising:
    an array of cells, each cell comprising:

a mirror plate having an upper reflective surface and a lower conductive surface;

a hinge electrically connected to the lower conductive surface of the mirror plate forming an axis around which the mirror plate rotates;

a support on a control substrate electrically connected to and supporting the mirror plate;

a first electrode on the surface of the control substrate on a first side of the axis; and a second electrode on the surface of the control substrate on a second side of the axis opposite to the first side;

wherein all of the mirror plates within the array are electrically connected to one another, the first electrode of each cell is electrically connected to a common voltage source and the array of cells are electrically connected to circuitry in the control substrate for selectively establishing an individual address voltage at each second electrode at each cell.

2. The device of claim 1, wherein each cell further comprises a third electrode in electrical communication with the mirror plate and the support and the third electrode of each cell is connected to a common dc offset in the control substrate.

3. The device of claim 2, wherein each cell further comprises a landing stop configured to extend upwardly from the control substrate and contact a bottom of the mirror plate when the mirror plate is rotated.

4. The device of claim 3, wherein the landing stop is electrically connected to the third electrode.

5. The device set forth in claim 3, wherein the third electrode is capable of establishing a sharp voltage potential transition from $V_b$ to $-V_b$ and from $-V_b$ to $V_b$ in less than one microsecond.

6. The device of claim 1, wherein the circuitry in the control substrate includes for each cell a single CMOS transistor electrically connected to the second electrode.

7. The device of claim 6, wherein the CMOS transistor is electrically connected to a storage capacitor.

8. The device of claim 1, wherein the circuitry includes a word-line/bit-line interconnection structure on the control substrate for communicating signals to the cells.

9. The device of claim 1, wherein the first electrode and the second electrode have at least one level of conductive step material raised above the surface of control substrate.

10. The device of claim 1, wherein the control substrate is free of inverters.

11. The device set forth in claim 1, wherein the hinge extends between two opposite corners of the mirror plate.

12. The device set forth in claim 1, wherein the hinge is parallel to an edge of the mirror plate.

13. A method of using a spatial light modulation device according to claim 1, comprising:

applying a common voltage from the voltage source to each first electrode in each cell in the array of the device; and addressing at least one second electrode, wherein two of the second electrodes are at different voltages from one another.

14. The method of claim 13, further comprising bringing each of the mirror plates to a common potential.

15. The method of claim 14, wherein each cell further comprises landing stops configured to extend upwardly from the control substrate and contact a bottom of the mirror plate when the mirror plate is rotated and the method further comprises bringing each of the landing stops to the common potential.

16. The method of claim 14, further comprising:

changing the common potential to a new potential and reverting back to the common potential; and changing the voltage applied to at least one second electrode from a first addressing potential to a second addressing potential, wherein the steps of changing the common potential, reverting back to the common potential and changing the voltage applied to at least one second electrode causes a corresponding mirror plate to rotate from a first position to a second position.

17. The method of claim 16, wherein the step of changing the common potential to the new potential and reverting back to the common potential comprises applying a sharp bipolar pulse.

18. The method of claim 16, wherein the second addressing potential is at least twice the magnitude of the common voltage applied at each first electrode.

19. A method of using a spatial light modulator, comprising:

applying a fixed voltage to a first electrode under a mirror plate;

applying an addressing voltage to a second electrode under the mirror plate;

applying a bias to the mirror plate, wherein the addressing voltage and the bias on the mirror plate are at the same polarity; and applying a sharp voltage pulse to the mirror plate, wherein the sharp voltage pulse is opposite in polarity to the bias applied to the mirror plate.

20. The method of claim 19, wherein the sharp voltage pulse has a magnitude equal to the bias applied to the mirror plate.

21. The method of claim 19, wherein the bias applied to the mirror plate is applied to landing tips and the sharp voltage pulse is simultaneously applied to the landing tips and the mirror plate.

22. The method of claim 19, further comprising changing the addressing voltage.

23. The method of claim 22, wherein changing the addressing voltage and applying the sharp voltage pulse occur simultaneously.

24. The method of claim 19, wherein the bias has a positive polarity and applying the sharp voltage pulse to the mirror plate includes applying a negative polarity.

25. The method of claim 24, wherein:

applying the sharp voltage pulse causes the mirror plate to rotate; and applying the sharp voltage pulse comprises applying a single sharp voltage pulse for each mirror rotation.

* * * * *